United States Patent [19]
Witt

[11] 4,121,295
[45] Oct. 17, 1978

[54] INTEGER WEIGHTED IMPULSE EQUIVALENT CODED SIGNAL PROCESSING APPARATUS

[75] Inventor: Richard P. Witt, Weston, Mass.

[73] Assignee: Wittronics, Inc., Weston, Mass.

[21] Appl. No.: 785,331

[22] Filed: Apr. 7, 1977

[51] Int. Cl.$^2$ ............................................. G06F 15/34
[52] U.S. Cl. ...................................... 364/724; 325/42; 360/65
[58] Field of Search .................. 235/152, 156; 325/41, 325/42, 65; 360/40, 65; 364/724

[56] References Cited
U.S. PATENT DOCUMENTS

| 3,252,093 | 5/1966 | Lerner | 325/42 |
| 3,745,463 | 7/1973 | Klein | 325/42 |
| 3,899,666 | 8/1975 | Bolger | 325/42 X |
| 3,984,789 | 10/1976 | Luvison et al. | 325/42 X |
| 4,001,564 | 1/1977 | Bied-Charreton et al. | 360/40 X |
| 4,027,258 | 5/1977 | Perreault | 325/42 X |
| 4,044,241 | 8/1977 | Hatley, Jr. | 235/152 |

Primary Examiner—Jerry Smith
Attorney, Agent, or Firm—Robert F. O'Connell

[57] ABSTRACT

A signal processing apparatus for use in data communications systems where the transmitted signal is subject to the effects of short duration interference, such as impulse noise, or for use in data recording systems where recorded data is subject to the effects of imperfections in the recording media, wherein a coded transformation is performed on an input signal to the apparatus in accordance with a selected time distribution and selected multi-level, integer related weighting functions to produce a coded signal. A decoder can be used to reversibly transform such signal so as to substantially reproduce the input signal in a manner such that the effects of such noise and recording imperfections are minimized.

17 Claims, 6 Drawing Figures

INTEGER WEIGHTED IMPULSE EQUIVALENT CODED SIGNAL PROCESSING APPARATUS

BACKGROUND OF THE INVENTION

Radio communication, with carrier frequencies of under 100 Mhz, and wire line communication systems are commonly understood to be limited by impulse noise effects rather than the effects of white gaussian types of noise. Impulse noise is introduced into communication channels from man made sources (e.g. ignition or relay contact sparking) or from atmospheric discharges (lightning) or other natural sources. The nature of impulse noise is such that the noise energy occurs in short time intervals with lesser or no noise energy between these discrete events. A different short interval disturbance in magnetic recording of data is known as pulse "drop out" and can be related to impure or absent recording material in small areas of the recording tape, disk or drum.

The technical literature of electronic communications includes several suggestions that data communications improvements could be effected by signal smearing-desmearing techniques for use on impulse noise affected channels. Such smearing-desmearing signal processing techniques are understood to be linear and reversible signal transforms which, by smearing (distributing the desired signal constituents broadly in time) before transmission and subsequently reassembling them at the receiving point, do no harm to the form and detectability of such desired signals. Impulses of noise, on the other hand, would not be influenced by the original smearing process, because of their normal introduction along the transmission path. At the reception point the desmearing process would spread the constituents of the noise impulses, to reduce their additive effect at any one point in time, as it "undid" the spreading of the desired signals. Carrying such an approach to its limit would distribute the impulse noise power uniformly, in time, and reduce impulse noise effects to the more manageable equivalent of a white gaussian noise of the same relative power. Use of such smearing-desmearing techniques would also help minimize phase jitter or very rapid fading effects of the communication path to the extent that the smeared signal would bridge across the disturbance and permit desmearing to reconstitute much of the original signal form. Recording pulse drop out would be alleviated by equivalent smearing-desmearing signal processing for the minimization of errors in recorded data.

Two generic approaches to the linear and reversible smearing-desmearing signal transformation are known. The all pass filter method provides for differing amounts of phase shift, or delay, at different frequencies within the spectrum of interest. The creation of such filter functions, and their inverse, is both a matter of design ingenuity and manufacturing complexity, with consequent expense. The alternative approach can be visualized in terms of a coding-decoding transformation carried out continuously or, on signal samples. The success of such coding methods is dependent on the amount of residual interference, from sample to sample, that results from imperfections in the coding-decoding process. One effect of the coding process is also to introduce different amounts of phase shift (or delay) at different frequencies (of the spectrum of interest) and to reversibly correct these effects in the decoder. It can be shown that the overall process of coding-decoding cannot be perfect, but highly useful resuls can be achieved.

Most work that has been done in coding has been limited to binary sequences. In the domain of binary coding, the "Barker sequences" have been called "perfect" and are provably the best binary codes for the coding-decoding type of smearing-desmearing protection against impulse noise effects on data communication. A full discussion of Barker sequences is found in the text "Radar Signals, An Introduction to Theory and Application" by C. E. Cook and M. Bernfield, Academic Press, New York, 1967, pp. 245 et sq. The use of such Barker sequences, which are purely two-level-integer related sequences, i.e. purely binary in nature, as effective codes for use in smearing-desmearing application is discussed below. In the subsequent discussions, a sampled signal interpretation will be utilized, but equivalent analysis of continuous waveforms would yield very similar conclusions.

A Barker code (or sequence) such as 1,1,1,0,1 will be interpreted as a signal of unit amplitude in successive time positions (chips) but having an inverted (negative) polarity in the fourth such position, in the five long sequence. A Barker coder can be defined as a device having an operation such that, when a single unit amplitude input signal is entered, the device will produce the sequence as an output signal, providing that the input signal duration is just equal to one chip of the output sequence. Such a device might be a lossless delay line with five taps equispaced along it, with these taps feeding a non-loading summing amplifier, and with the fourth tap output being inverted. If the taps were spaced, say, 1 microsecond apart on the delay line, the entering of a 1 volt pulse of 1 microsecond duration could generate, out of the summing amplifier, a voltage sequence of 1,1,1,−1,1 covering a total of 5 microseconds duration and being a representation of the code 1,1,1,0,1. A decoder for this code (or sequence) can be visualized as another tapped delay line in which the time inverse weighting, namely 1,0,1,1,1 is utilized. This is to be interpreted as meaning that the second tap output is inverted into the summing circuit. If the previous Barker sequence (1,1,1−1,1) is then entered into the decoder, an output of 1,0,1,0,5,0,1,0,1 will obtain, where such output values are in units of amplitude and "0" means no amplitude (rather than a signal inversion). This output will be called the autocorrelation function for the sequence 1,1,1,−1,1. The output "5" will be called the autocorrelation peak, while the 1's existing in other positions will be called "hash". Thus, the code can be said to have a peak to (worst) hash ratio (P/H) of 5:1. It can also be noted that it has a peak to sum of the hash (P/Σ hash) ratio of 5:4. Though all of the above notation has considered unit amplitude signals, the coder and decoder can be linear and would correspondingly scale all amplitudes accordingly. The P/Σ hash ratio may be considered a measure of intersymbol interference in the following discussion.

If an input sequence 1,1 were entered into the coder (each symbol lasting for 1 microsecond) then the output would be the summation of the independently generated inputs, with a time (position shift) accounting for sequence position. Thus:

$$\begin{array}{r} 1,1,1,-1,\phantom{0}1 \\ +\phantom{00}1,1,\phantom{00}1,-1,1 \\ \hline 1,2,2,\phantom{-}0,\phantom{-}0,1 \end{array}$$

being generated at the output of the coder. Similarly, if code 1,0,1 is entered into the encoder and the encoder output is then fed to the decoder, a composite decoder output consisting of the sum of the individual signal outputs is obtained.

$$\begin{array}{r} 1, \phantom{-}0,1, \phantom{-}0,5, \phantom{-}0,1, \phantom{-}0,1 \\ -1,0,-1,0,-5,0,-1,0,-1 \\ +\phantom{-}1, \phantom{-}0,1, \phantom{-}0,5, \phantom{-}0,1, \phantom{-}0,1 \\ \hline 1,-1,2,-1,6,-5,6,-1,2,-1,1 \end{array}$$

Note that the negative of the correlation function is used here for the inverse "0" portion of the input code. The 6,−5,6 portion of the output corresponds to the separate correlation peaks for the 1,0,1 input, but the hash effects are large because they have added in the composite. Indeed, if a longer composite signal were generated, from a longer input sequence, the correlation peaks would be very significantly perturbed from the original value of 5. Such perturbation of the peak seriously interferes with detectability of these peaks, especially in the presence of additive noise effects. As such, the Barker sequences cannot be considered as very useful for this mode of data communication. Additionally, the numbers of available Barker sequences is very limited, and there are none longer than thirteen terms.

The above difficulties with even the "perfect" binary codes have led to investigation of non-binary signals with the goal of complete suppression of all hash, except for some irreducibly small effects at the beginning and end of the autocorrelation function. Where freedom of amplitude and partial phase freedom is permitted, such hash suppressed codes are called Impulse Equivalent Codes. The use of such codes is described in the article "The Generation of Impulse-Equivalent Pulse Trains", D. A. Huffman, IREE Transactions on Information Theory, Vol. II-8, 1962, pp. 510–516. The techniques available for the discovery of such codes are only slightly developed and have led to only a few examples; these suffer from non-uniform time distribution of the signal energy.

Efforts at improving on the Impulse Equivalent Codes have produced the Strictly Complex Impulse Equivalent Codes which utilize the complete freedom of variable phase between elements of the code sequence. Such codes are described in the article "Strictly Complex Impulse-Equivalent Codes and Subsets With Very Uniform Amplitude Distribution", J. R. Caprio, IREE Transactions on Information Theory, Vol. IT-15, 1969, pp. 695–706. These provide an improved distribution of signal energy, at the expense of considerable added complexity and costs.

SUMMARY OF THE INVENTION

This invention utilizes a new implementation of coders and decoders for the purpose of reducing the effects of impulse noise and other short duration error producing effects. In particular, multi-level integer related weighting functions which are relatively easy to implement are used to produce practical levels of autocorrelation hash, i.e. levels such that the P/H and P/Σ H ratios are relatively high so that the error producing effects are minimal. Methods of discovery of such codes using multi-level integer related weighting functions are disclosed and a number of implementations of these codes in practical coders and decoders for data communication or recording are shown.

The Barker sequences always have an autocorrelation function peak to Σ Hash ratio P/Σ H of $n/n-1$ where $n$ is the number of terms in the sequence. Because this ratio is close to unity, for sequence lengths of interest, these sequences lead to large intersymbol interference and are not meaningful for smearing-desmearing communication signal processing. A number of interesting multi-level, integer related impulse equivalent sequences are derivable from the addition of two different length Barker sequences, however. Thus, the addition of the $n=3$ code having 1,1,0 as its voltage sequence and the $n=5$ code having 1,1,1,0,1 as its voltage sequence yields $$\begin{array}{r} 1,1,-1 \\ 1,1,1,-1,1 \\ \hline 1,2,2,-2,1 \end{array}$$

which has the autocorrelation function
1,0,0,0,14,0,0,0,1
as previously defined. This result provides a P/Σ Hash ratio of 7, which is much better than any result available from a Barker sequence alone. Thus, the input signal "1" can be transformed into successive output signals 1,2,2,−2,1 (i.e. a "smearing" process) and then reversibly transformed (i.e. a "desmearing" process) to 1,0,0,0,14,0,0,0,1 which, except for the arbitrary 14:1 scale factor and the small perturbations five positions away from the correlation peak, essentially constitutes a reconstruction of the original input.

In a similar manner, the addition of an $n=5$ Barker code to an $n=7$ code can yield 1,2,2,0,−2,2,−1 with a P/Σ Hash of 9. The addition of an $n=11$ and an $n=13$ sequence can result in 1,2,2,2,0,−2,−2,2,0,−2,2,−2,1 with a P/Σ Hash of 38/34.

Each of the above derived sequences has three other equivalent forms corresponding to the time inverse form, to the voltage inverse form, and to the time and voltage inverse form, respectively. Thus 1,2,2,−2,1 is related to 1,−2,2,2,1 (time inverse) as well as to −1,−2,−2,2,−1 (voltage inverse) and to −1,2,−2,−2,−1 (time and voltage inverse). Because linear scaling will not effect the results except in magnitude, 1,2,2,−2,1 is scalable by a factor of four to 4,8,8,−8,4 (or by any other suitably selected factor) without effecting the P/Σ Hash ratio. This latter value may now be further modified empirically but relatively simple, by adding a binary sequence that is 4 terms long and has 0 inserted between each term.

$$\begin{array}{r} 4,8,8,-8,4 \\ 1,0,1,0,-1,0,-1 \\ \hline 1,4,9,8,-9,4,-1 \end{array}$$

This result has the autocorrelation function −1,0,−2,0,1, 0,260,0,1,0,−2,0,−1 with a P/Σ Hash of 260/8 = 32.5 which represents a significant improvement while retaining an integer form for the derived sequence.

A more complex and empirical scaling and modification of 1,2,2,0,−2,2,−1 has yielded 1,4,9,10,0,−10,9,−4,1 with P/Σ Hash of 396/12 = 33. These scaled and modified sequences have the previously mentioned equivalent forms.

Another Barker sequence modification procedure consists of doubling all terms except the end terms. For some sequences this effect is similar to that achieved by adding another sequence that is two terms shorter to the middle terms of the original. Thus 1,1,1−1,1 becomes 1,2,2,−2,1 directly or through the previous addition of terms. Barker sequence 1,1,1−1,−1,−1,1,−1,−1,1,−1 would become 1,2,2,−2,−2,−2,2,−2,−2,2,−1 while 1,1,1,1,1,−1,−1,1,1,1,−1,−1,1,1,−1 would become 1,2,2,2,2,−2,−2,2,2,−2,2,−2,1.

Another method of deriving multi-level, integer related weighting function sequences, with good P/Σ Hash ratios, compounds simple sequences into longer sequences by replacing an integer with a sequence. Thus if each of the five units in the sequence 1,2,2,−2,1 is itself replaced by the sequence (1,−2,2,2,1) the resulting sequence is:

```
1,−2,2,2,1
   2,−4,4,4,2
       2,−4,4,4 2
            −2,4,−4,−4,−2
                    1,−2,2,2,1
―――――――――――――――――――――――――――
1,−2,2,2,3,−4,4,4,4,−4,4,4, 0,4,−4,−4,−1,−2,2,2,1
``` which resulting voltage sequence when autocorrelated provides a P/Σ Hash ratio of 196/60. A different time spacing might also be used, as in the following sequence:

```
1,−2,2,2,1
   2,−4,4,4,2
         2,−4,4,4,2
              −2,4−4,−4,−2
                          1,−2,2,2,1
―――――――――――――――――――――――――――
1,−2,2,2,1,2,−4,4,4,2,2,−4,4,4,2,−2,4−4,−4,−2,1−2,2,2,1
``` which results in an autocorrelated P/Σ Hash ratio of 196/68. These relatively long Barker derived sequences and their equivalent forms have the desirable attribute of permitting greater smearing than short sequences.

Further techniques for deriving good multi-level integer related weighting function sequences are related to concepts of transversal or mismatched filters and can be seen with respect to the previously mentioned sequence 1,2,2,2,2,−2,−2,2,2, −2,2,−2,1 which has the autocorrelation function 1,0,0,0, 0,0,8,0,0,0,0,0,46,0,0,0,0,0,8,0,0,0,0,0,1. Each of the two hash peaks of 8 units amplitude contributes significantly to interference with proper signal detection in a smearing-desmearing system. It would be desirable to suppress these hash peaks without otherwise seriously deteriorating the signal processing performance. One approach thereto is to provide for a cancelling peak in the same time position and of equivalent amplitude as the undesired hash peaks. Noting that the hash peaks are about one sixth the amplitude of the autocorrelation peak it is possible to scale the original sequence up by a factor of 6 and then to add amplitude inverted and time shifted original sequences to it in the manner shown below:

and decoder sequences exists and in some applications such inequality may be undesirable.

Such objections can be decreased through a modification of the above sequence modification procedure. Thus, if a scaling factor of 12 (rather than 6) is used, then only one half as much correction will occur in adding the amplitude inverted and time shifted original sequences. The result −1,−2,−2,−2,−2,2,14,22,22,26,22,−22,−26, 22,22,−26,22,−22,14,−2,−2,2,−2,2,−1 may then be decoded in a filter consisting of its own time inverse function, yielding the desired improved P/Σ Hash autocorrelation results, where maintaining the coder and decoder designs similar, and also providing a reasonably uniform power distribution through the 11 middle positions of the sequence.

As used herein the term "multi-level" is deemed to include the concept of three or more amplitude levels, as opposed to two-level, or binary, coded sequences. Moreover, a sequence such as 1,2,2,−2,1 can be scaled to 1/2,1,1,−1,1/2, or it may be modified in unimportant ways such as 1.03,1.94,1.97,−2,0.96 whereby the term "multi-level, integer related" may seem technically incorrect. Such changes, however, are to be expected due to component tolerances, or may be used to compensate for delay line imperfections and to make small improvements in hash reduction. Such changes should be understood as specifically included in the term "multi-level, integer related" as used herein with respect to the invention.

A considerable amount of trial and analysis may be involved in selecting suitable combinations and modifications of Barker sequences which yield good multi-level, integer related impulse equivalent sequences. However, the use of such codes to effect the desired signal processing weighting functions in accordance with the invention offers advantages not easily available in previously used systems.

From the above discussion the feasibility of generating good multi-level, integer related smearing-desmearing signal sequences particularly as derived from Barker sequences has been shown. Thus, Barker sequences can be combined to give good short sequences. Such short sequences are then combinable to generate longer sequences with generally poorer P/Σ Hash characteristics. As long as the generated sequence has Σ Hash that is not too large in value, the hash suppression techniques can be applied to create a modified sequence with good characteristics. The preservation of the integer signal form throughout these transformations is conducive to the use of simple digital processing in the coder and decoder equipments with benefits in cost, design stability, and accuracy or realizability, especially

```
              6,12,12,12,12,−12,−12,12, 12,−12,12,−12,6
(−1,−2,−2,−2,−2,2,2,−2,−2, 2,−2, 2, −1)
                           (−1,−2, −2, −2,−2, 2,2,−2,−2,2,−2,2,−1)
――――――――――――――――――――――――――――――――――――――
−1,−2,−2,−2,−2,2,8,10,10,14,10,−10,−14,10,−10, 14,10,−10,8,−2,−2,2,−2,2,−1
```

If this last derived sequence is decoded, not in its own time inverse filter but in the time inverse of the original sequence a P/Σ Hash of approximately 20 is achieved in the resulting decoder output. This process represents a great improvement over presently known systems although in some applications the relative unevenness of the transmitted power might be undesirable. Additionally, an unequal processing length between the coder for the longer sequences. The use of such good sequences as weighting functions for signals distribution in the time domain before transmission, together with the ability to correlate these distributed signals so as to essentially reproduce the signals in their original form provides for improved transmission of such signals in an impulse noise environment. Such weighting functions may also be used in the weighted distribution of data signals prior to recording data on a recording medium, for example, and to reconstitute such recordings essentially to their original data signal form, despite imperfections which may be present in the recording media.

In summary, codes using multi-level, integer related weighting functions can be effectively utilized in data communication signal processing systems in order to reduce the effects of impulse noise and other short term transmission disturbances on conventional wire line or radio circuits. Further, such coders can also be effectively used in recording systems to reduce the effects of imperfections in the recording system.

DESCRIPTION OF THE INVENTION

DESCRIPTION OF PREFERRED EMBODIMENTS

Figure 1:
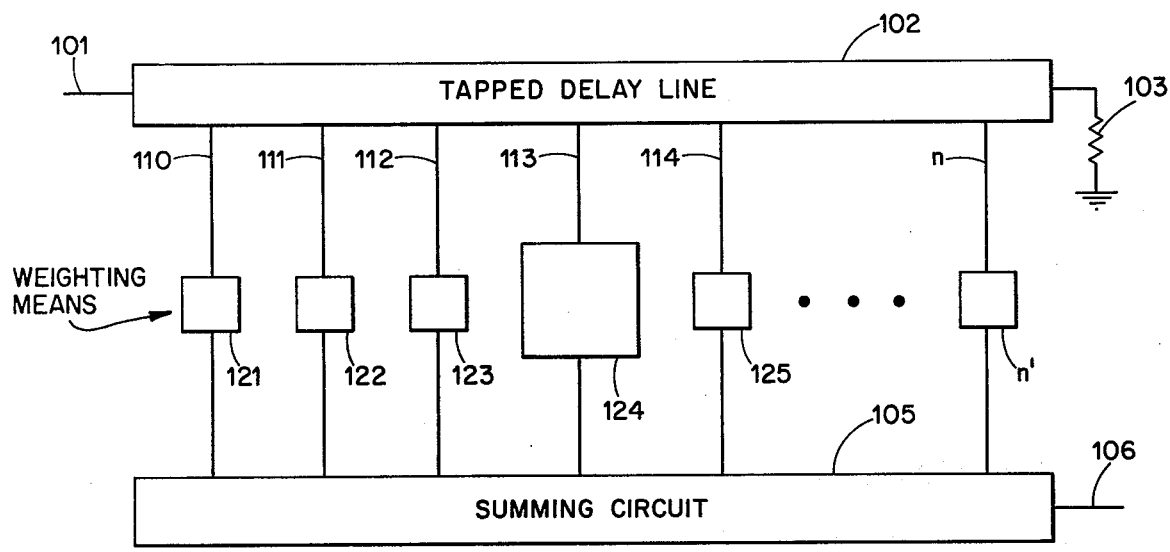
FIG. 1 shows a block diagram of one embodiment of a coder, according to the invention, consisting of a tapped electromagnetic delay line, signal weighting means and a summing amplifier.

FIG. 1 is a depiction of one form of a signal smearing or signal desmearing system. A signal on input lead 101 is entered into delay line 102. Said delay line may be of a distributed or lumped element type or even of an accoustic or magneto-strictive form, such elements being well-known to the art. A series of $n$ equi-delayed taps 110, 111 permit sampling the signal condition after various delay periods. The delay line is terminated by resistive element 103 or other means to minimize reflections of signals after they have passed all the way through the delay line. Element 121 is a signal sensing and weighting means connected by conductor to tap point 110. The element 121 will be chosen of such a high impedence as to not significantly effect the signals within delay line 102. A further constraint on element 121 is that it shall pass a signal, to the signal summing circuit 105, that is proportional to the product of the sensed signal at tap 110 and a prescribed weighting function. In like manner the product of the signal sensed at tap 111 and an assigned weighting will be passed by element 122 to summing circuit 105. This process can be continued for as many terms as are required in the impulse equivalent code. For the code 1,2,2,−2,1 it would be necessary to utilize the five sensing taps 110, 111, 112, 113 and 114 as shown. Element 121 might then consist of some large value of resistor R. Elements 122 and 123 would be required to pass to summing circuit 105 twice the signal proportion as element 121 and this would be achieved if each of these elements were resistors equal to R/2. Element 124 is required to pass to summing circuit 105 minus twice the signal proportion of element 121 and this can be accomplished by inverting the signal sensed at tap 113 and then using a resistor equal to R/2 for connection into summing circuit 105. Finally the tap at 114 can be weighted with another resistor equal to R to control its signal into summing circuit 105. Circuit 105 may consist of an operational amplifier summing circuit such as is well known in the art. The output at circuit 106 will then be a continuous impulse equivalent coded representation of inputs at line 101 through the 1,2,2,−2,1 transform. These signals will be of the smeared form and can be desmeared in an equivalent device utilizing the inverse transform 1,31 2,2,2,1. The desmearing device would be the same as in FIG. 1 and the above description except that elements 122 and 124 would be interchanged.

Figure 2:
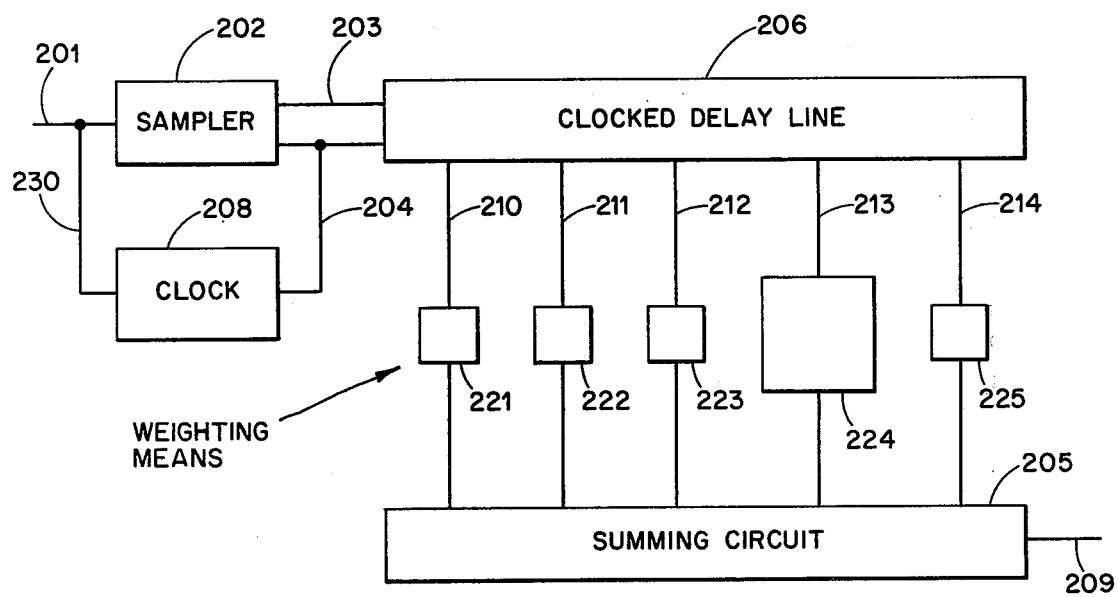
FIG. 2 shows a block diagram of an alternative embodiment of a coder, according to the invention, and consists of signal sampling means, a clocking means, a charge coupled delay line signal weighting means and a signal summing amplifier.

FIG. 2 is another embodiment of a signal smearing or desmearing equipment. In this embodiment an input signal on line 201 is sampled by sampler 202 periodically as directed by signals on line 204 from single or multiphase electrical clock source 208. The amplitude samples are preserved on line 203 until the next sample time is indicated by a subsequent signal on line 204. Clocked delay line 206 might be of the well known charge coupled device or bucket brigade forms of implementation. Delay line 206 will enter the signal on line 203, whenever indicated by the clock signal on line 204, and will simultaneously advance previous signal samples through the delay line 206. In some embodiments of delay line 206 the sampling function of sampler 202 may be unnecessary and line 203 may be utilized directly as the signal input. Commercial products such as Reticon TAD-32 may be used in such an implementation. Output line 210 represents the most recent signal sample while line 211 would provide the next previous signal sample. The signals on lines 212, 213 and 214 would represent outputs of progressively more early signal samples, the number of such samples provided being determined by the number of terms needed in the overall impulse equivalent code transform. Weighting elements 221 to 225 and summing circuit 205 are understood to be substantially the same as those shown in FIG. 1 with respect to weighting elements 121 to 125 and summing circuit 105. The output of line 209 will be a stairstep sampled signal form and may be smoothed by a subsequent filter if desired. Clock 208 should operate at a rate to provide at least two signal samples per cycle of the highest important frequency constituent of the input signal at line 201 if the smearer is used in a transparent or asynchronous mode. On the other hand, synchronous operation may be achieved at the bit or baud rate of data signals on line 201 if optional coupling means 230 are provided from the input signal line 201 to clock source 208 and if further means are provided within 208 to cause it to operate in a synchronous or locked mode with said source signals 201. A phase locked loop oscillator or other synchronous clocking means may be used for 208 in this latter mode, as would be well known to those in the art.

Figure 3:
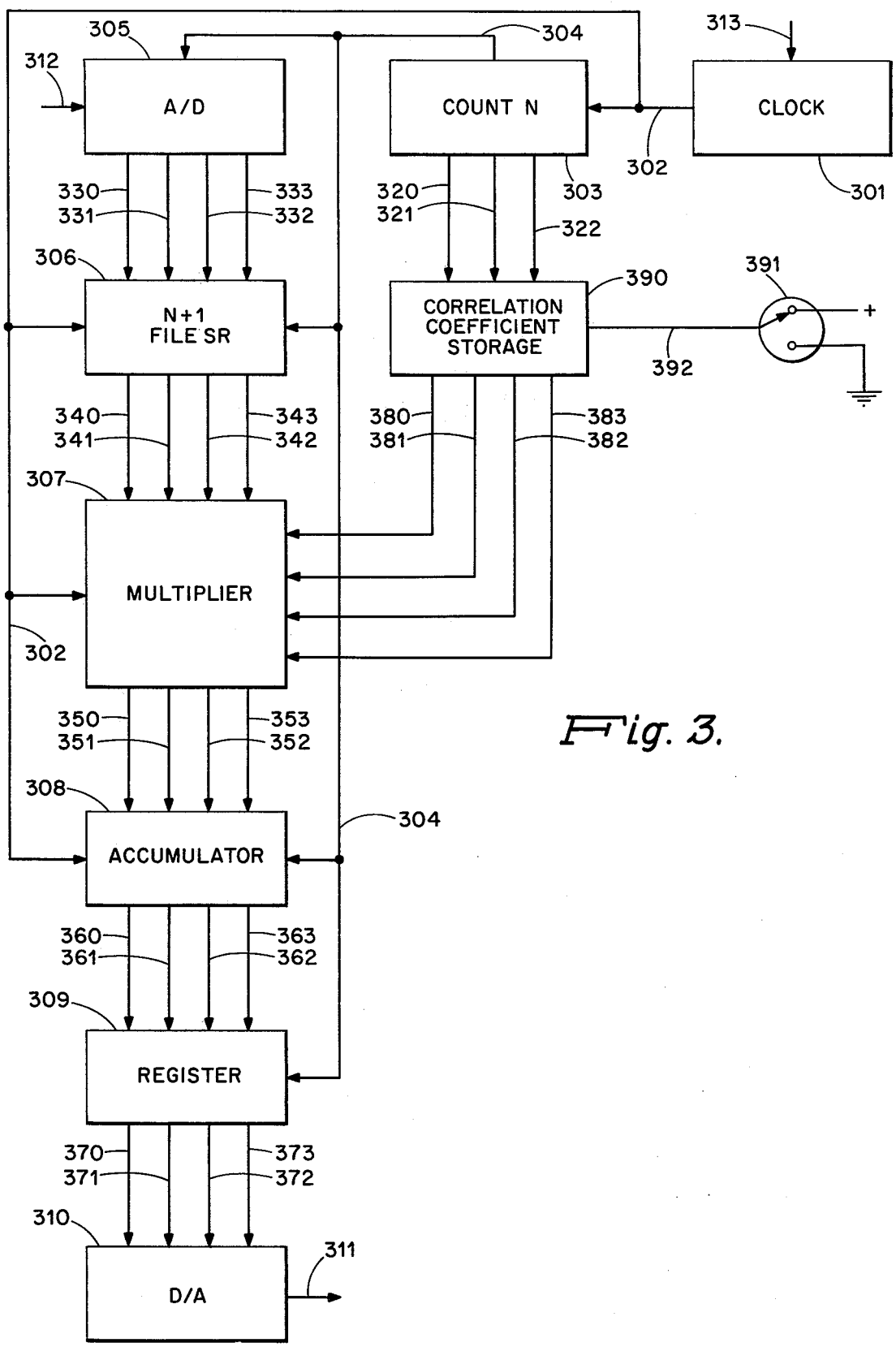
FIG. 3 shows a block diagram of still another embodiment of a coder/decoder, according to the invention including an analog to digital converter, signal storage and precession means, correlation coefficient storage, multiplication and summation means, control means and a digital to analog converter means.

FIG. 3 is another embodiment of a signal smearing and desmearing system according to the invention. Clock timing control 301 causes binary counter 303 to step through N different counting states and then to return to its initial state. Clock 301 may be synchronously free running or synchronized to input signals by optional synchronizing input 313 in a manner similar to that described in the previous embodiment. The number of steps N must be at least as large as the number of terms in the chosen sequence to be used for signal smearing or desmearing. At the final count of counter 303, an output signal will be generated on line 304 to initiate the start of a new cycle of operations in analog to digital (A/D) converter 305 and in other equipments to be subsequently described. Additional outputs 320, 321, and 322 and others, if needed, from counter 303 permit addressing of correlation coefficient storage means 390 in concert with smearing vs desmearing switch selectable means 391 connected to line 392. The addressed coefficients of each count of N correspond to successive terms in the selected sequence and may contain extra null or zero terms proceeding or following the sequence for ease of implementation if N is greater than the number of terms in the sequence. Addressed coefficients of storage means 390 are available on lines 380 through 383 to feed multiplier 307. These inputs to multiplier 307 will provide the sequential weighting factors for multiplication with signals to be separately provided on lines 340 through 343. Though 4 lines are shown for each set of inputs to multiplier 307, this should be understood to be a design choice and may be different depending on the application.

The final count signal at line 304 causes outputs 330 through 333, from A/D converter 305, to be entered into shift register file 306. Clock signal 302 will then shift data in file 306 in step with the counting in converter 303 and the presentation of sequence terms from storage means 390. File 306 is a register of length N+1 for each of its input bits and recirculates its output contents back to its input except during final count signals on line 304. Thus successive samples of data are stored in register file 306 and shifted and precessed therein with respect to counts of converter 303. After initial start up, counter 306 will contain the latest N+1 samples of input signal 312 as converted to digital form by A/D converter 305. Multiplier 307 then sequentially determines the product of these input terms and the sequence coefficients and makes these available to accumulator 308 by lines 350 through 353 and other such if needed. Though multiplier 307 may operate in a clocked manner by the clock signal at line 302, it may also operate free running if so designed. The term by term outputs of multiplier 307 are summed into accumulator 308 at clock times by the clock signal at line 302 in between signals occurring on line 304. At the time of the signal on line 304, register 309 captures the final value in accumulator 308 at the same time the latter is cleared by the signal on line 304. Register 309 then holds this final value until the next signal on line 304 and makes this value available on lines 370 to 373 for input to digital to analog (D/A) converter 310. Converter 310 converts its input signals to analog form on line 311 for transmission or for feeding to a conventional modem depending on whether smearing or desmearing, as controlled by switch 391, are being performed, such choices corresponding to the transmission or reception of signals. The output signal at line 311 may be followed by filtering to smooth out the sampled data form of these signals, if needed.

Figure 4:
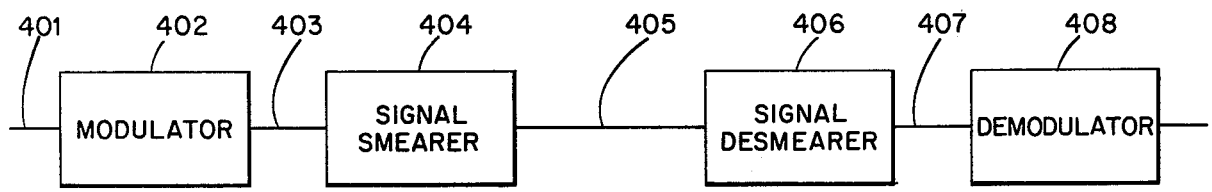
FIG. 4 shows a block diagram of a telephone line communication system, according to the invention, including a modulator and a signal smearer (coder) coupled by telephone line to a signal desmearer and a demodulator.
Figure 5:
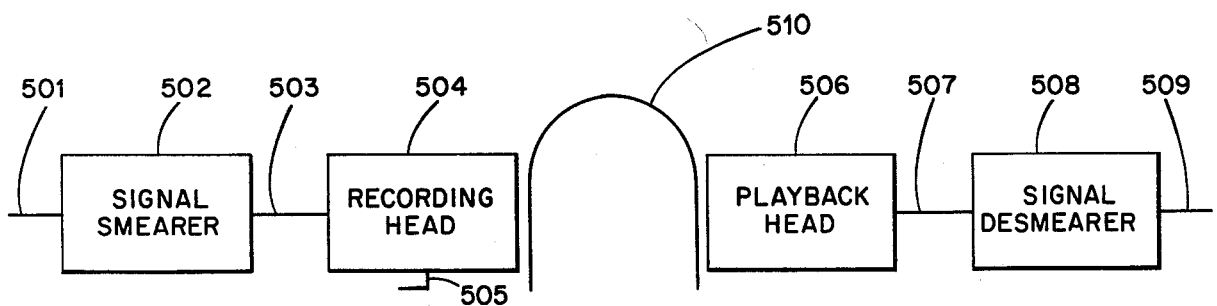
FIG. 5 shows a block diagram of a recording system, according to the invention, including a signal smearer (coder), a recording head, a playback head and a signal desmearer (decoder).
Figure 6:
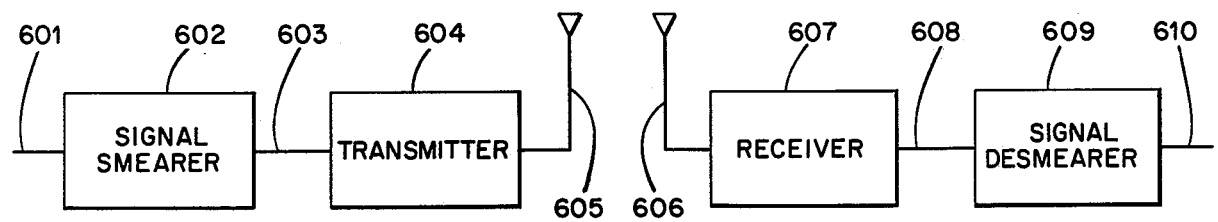
FIG. 6 is a block diagram of a radio transmission system, according to the invention, including a signal smearer, a transmitter, an antenna, a receiver with antenna and a signal desmearer.

The above embodiments of signal smearing apparatus and signal desmearing apparatus are readily adaptable for implementation and use in several different types of systems, as depicted in the exemplary systems shown in FIGS. 4, 5 and 6. FIG. 4, for example, represents a telephone line communication system in which data on line 401 is supplied to modulator 402, being the transmitter portion of any conventional type of modem for telephone service. The output of modulator 402 on line 403 is fed to signal smearer 404 instead of its conventional connection directly to the telephone line 405. Under the invention, smearer 404 makes the connection to line 405 which carries signals to signal desmearer 406 which at line 407 restores the signal to essentially the form earlier present in line 403. The signal on line 407 is, therefore, in form for detection by demodulator 408 which would be the companion reception portion of said standard modem. In this system, line 405 would normally be a twisted pair telephone line and the smearer and desmearer would be adapted for balanced driving and receiving, respectively, of signals on such media, as is well understood in the art.

FIG. 5 depicts another configuration for use of the signal smearing and signal desmearing apparatus in a magnetic recording system. Input signals on line 501 are fed to signal smearer 502 which, in turn, feeds recording head 504 through line 503. Head 504 translates the electrical signals fed to it into magnetic flux for impression on adjacent and movable magnetic media 510. Linear recording on said media is effected by introducing a high frequency bias signal into head 504 through separate line 505 or by addition of the bias signal at line 503 as is well understood in the art. Smeared magnetic flux impressions on said media 510 may be picked up by playback head 506 by moving said media past head 506 in ways well understood in the art. Head 506 converts the flux impressions into electrical signals at line 507 for feeding to signal desmearer 508 and thence to line 509 for subsequent frequency compensation processing and/or use.

FIG. 6 depicts a signal smearer and signal desmearer apparatus usage, according to the invention, for radio transmission and reception systems. In such radio systems an input signal lead 601 feeds signal smearer 602 and its output line 603 feeds transmitter 604. Transmitter 604 converts its inputs to high frequency electromagnetic radiation from an associated antenna 605. Said radiations would be received by an antenna 606 and receiver 607, and would convert such electromagnetic radiations to detected electrical signal at line 608 for processing by desmearer 609 and then for subsequent use from output line 610.

Although the invention has been described with reference to the particular embodiments described above, it will be understood to those skilled in the art that the invention is capable of a variety of alternative embodiments within the spirit and scope of the appended claims.

What is claimed is:

1. A system for processing an input signal comprising coding means responsive to said input signal for linearly transforming said input signal in accordance with a selected time distribution and selected multi-level, integer related weighting functions to produce a plurality of weighted signals, the weighting functions being selected so as to provide a reasonably uniform power distribution of the larger amplitude ones of said plurality of weighted signals and so as to provide a ratio of the peak amplitude of the autocorrelation function of said plurality of weighted signals to the sum of the non-peak amplitudes thereof which is greater than $n/(n-1)$ where $n$ is the number of terms in said plurality of weighted signals; and means responsive to said coding means for combining said weighted signals to produce a coded output signal.

2. A system in accordance with claim 1 wherein said selected weighting functions are derived from Barker sequences.

3. A system in accordance with claim 2 and further including decoding means responsive to said coded output signal for reversibly transforming said coded output signal to produce a signal which is a substantial reproduction of said input signal.

4. A system in accordance with claim 3 wherein said decoding means is an autocorrelation means.

5. A signal processing system in accordance with claim 1 and further including means responsive to said coded output signal for transmitting said coded output signal through a transmission medium having impulse noise signals;

means for receiving said transmitted coded output signal; and decoding means responsive to said receiving means for reversibly transforming said transmitted coded output signal to produce a signal which is a substantial reproduction of said input signal in which the effects of said impulse noise signals thereon are substantially reduced.

6. A signal processing system in accordance with claim 5 wherein said selected weighting functions are derived from Barker sequences.

7. A system in accordance with claim 5 wherein the reversible transformation of said transmitted coded output signal by said decoding means is the time inverse of the linear transformation provided by said coding means.

8. A signal processing system in accordance with claim 1 wherein said coding means comprises delay line means responsive to said input signal for providing a plurality of time distributed intermediate signals; and weighting means responsive to said time distributed intermediate signals for operating on said intermediate signals in accordance with said selected weighting functions.

9. A signal processing system in accordance with claim 8 wherein said selected weighting functions are derived from Barker sequences.

10. A signal processing system in accordance with claim 8 wherein said delay line means is a clocked delay line means and includes means for synchronously clocking said delay line with said input signal.

11. A signal processing system in accordance with claim 8 wherein said delay line means is a clocked delay line means and includes means for asynchronously clocking said delay line with said input signal.

12. A signal processing system in accordance with claim 1 wherein said selected weighting function is 1, 2, 2, −2, 1.

13. A signal processing system in accordance with claim 1 wherein said weighting function is −1, −2, −2, −2, −2, 2, 14, 22, 22, 26, 22, −22, −26, 22, 22, −26, 22, −22, 14, −2, −2, 2, 2, −2, 2, −1.

14. A signal processing system in accordance with claim 1 wherein said weighted function is 1, −2, 2, 2, 1, 2, −4, 4, 4, 2, 2, −4, 4, 4, 2, −2, 4, −4, −4, −2, 1, −2, 2, 2, 1.

15. A signal processing system in accordance with claim 1 wherein said weighted function is 1, 4, 9, 10, 0, −10, 9, −4, 1.

16. A system for recording data input signals comprising data signal smearing means for linearly transforming said data input signals to produce smeared data output signals in response thereto, said data signal smearing means including coding means responsive to said data input signals for linearly transforming said signals in accordance with a selected time distribution and selected multi-level, integer related weighting functions to produce a plurality of weighted signals, the weighting functions being selected so as to provide a reasonably uniform power distribution of the larger amplitude ones of said plurality of weighted signals and so as to provide a ratio of the peak amplitude of the autocorrelation function of said plurality of weighted signals to the sum of the non-peak amplitudes thereof which is greater than $n/(n-1)$ where $n$ is the number of terms in said plurality of weighted signals; and means responsive to said coding means for combining said weighted signals to produce smeared data output signals;

means for recording said smeared data output signals; and desmearing signal processing means responsive to said recorded smeared data output signals for reproducing said data input signals therefrom.

17. A system in accordance with claim 16 wherein said selected weighting functions are derived from Barker sequences.

* * * * *

UNITED STATES PATENT AND TRADEMARK OFFICE
CERTIFICATE OF CORRECTION

PATENT NO. : 4,121,295
DATED : October 17, 1978
INVENTOR(S) : RICHARD P. WITT

It is certified that error appears in the above-identified patent and that said Letters Patent are hereby corrected as shown below:

Column 5, line 4, change the last three numerical numbers in the sequence from "-1,1,-1" to --1,-1,1--.

Column 5, line 28, after "4" insert a comma (,);

lines 55-58, the alignment of numbers should be corrected as follows:

```
                  6,12,12,12,12,-12,-12,12,12,-12,12,-12, 6
(-1,-2,-2,-2,-2, 2, 2,-2,-2, 2,-2,  2,  -1)
                              (-1,-2,-2, -2,-2,  2, 2,-2,-2, 2,-2, 2,-1)
-1,-2,-2,-2,-2, 2, 8,10, 10,14, 10,-10, -14, 10, 10,-14, 10, -10, 8, -2,-2, 2,-2, 2,-1
```

Column 8, line 19, cancel "31";

line 20, before "2" (first occurrence), insert a minus sign.

Signed and Sealed this

Seventeenth Day of July 1979

[SEAL]

Attest:

LUTRELLE F. PARKER
Attesting Officer   Acting Commissioner of Patents and Trademarks